Jan. 8, 1946.   L. G. SIMJIAN   2,392,781
TRAINING APPARATUS
Filed Feb. 13, 1943   6 Sheets-Sheet 1

Jan. 8, 1946. L. G. SIMJIAN 2,392,781
TRAINING APPARATUS
Filed Feb. 13, 1943 6 Sheets-Sheet 2

Jan. 8, 1946.  L. G. SIMJIAN  2,392,781
TRAINING APPARATUS
Filed Feb. 13, 1943  6 Sheets-Sheet 3

INVENTOR
L. G. Simjian
BY
A. H. Golden
ATTORNEY

Jan. 8, 1946.   L. G. SIMJIAN   2,392,781
TRAINING APPARATUS
Filed Feb. 13, 1943   6 Sheets-Sheet 5

INVENTOR
L. G. Simjian
BY
A. H. Golden
ATTORNEY

Jan. 8, 1946.  L. G. SIMJIAN  2,392,781
TRAINING APPARATUS
Filed Feb. 13, 1943   6 Sheets-Sheet 6

INVENTOR
*L. G. Simjian*
BY
*A. H. Golden*
ATTORNEY

Patented Jan. 8, 1946

2,392,781

UNITED STATES PATENT OFFICE 2,392,781

TRAINING APPARATUS

Luther G. Simjian, Riverside, Conn.

Application February 13, 1943, Serial No. 475,743

45 Claims. (Cl. 35—25)

This invention relates to mechanism used for training aviators in identifying aircraft or ships, in determining the speed of movement of aircraft, direction of movement, and other related factors that are important in combat flying.

It is the object of my invention to devise a training apparatus that will be helpful in training aviators in the accomplishments above set forth. As one feature of my invention whereby the several objectives thereof are attained, I employ a reflecting system and a scale model of an airplane to project the image of the airplane model to a sighting point, it being a further feature of the invention that at least certain of the parts are movable whereby to vary the apparent distance between the airplane model and the sighting point. The term sighting point is used to designate that structural portion of the apparatus of my invention where the eyes of the aviator are to be positioned in the use of the apparatus.

As a further feature of my invention a part of the reflecting system is movable relatively to an airplane model whereby to change the apparent distance between a sighting point and the airplane model. As still a further feature of my invention, the image of the airplane model is preferably reflected to the sighting point along a predetermined line in all the positions of the relatively movable part of the reflecting system.

As a further feature of my invention, mirrors are used to form that portion of my reflecting system that is movable relatively to the airplane model and to reflect the image of the airplane model to a sighting point. As still a further important feature of my invention, at least the final of one of the relatively movable mirrors is adapted for compound movement whereby in all positions thereof it reflects the image of the airplane model to the sighting point along a predetermined line.

In the preferred form of my invention, a part of the reflecting system of mirrors is moved relatively to a fixed airplane model, a pair of moving mirrors being used, and these mirrors being adapted for pivotal movement as well as movement bodily relatively to the airplane model. Those skilled in the art will fully appreciate that it is possible to change the system while following my teachings to the art, and to employ a moving airplane model and stationary mirrors, or both moving mirrors and a moving airplane model. I shall therefore claim my invention in a manner sufficiently broad to cover those structural combinations of the parts of my invention suggested by my contribution to the art.

A further feature of my invention resides in the relationship of the mirrors, the airplane model and the sighting point relatively to a sighting glass that is in predetermined calibrated relation to the movement of the mirrors, whereby the apparent distance of the airplane from the observer at the sighting point, and the apparent speed of movement of the airplane as developed by the moving mirrors, may be readily determined.

A further feature of my invention resides in means whereby the airplane model is readily moved to assume different positions while in apparent flight whereby to make possible its study and identification under the equivalent of actual combat conditions. A still further feature of my invention resides in means used for illuminating the airplane model so as to simulate all types of light conditions such as early dawn or sunset, full mid-day sunlight, etc.

A still further feature of my invention resides in the mounting of appropriate dial mechanism in a particular position on the apparatus where it may be used to indicate the apparent distance of the airplane from the sighting point, this indicating mechanism being utilized in one modification to facilitate examination of student pilots.

A still further feature of my invention resides in what I term a double ender machine in which two sighting points are utilized in combination with a moving mirror carriage for facilitating the teaching of a group of students, preferably by a single instructor.

A still further feature of my invention resides in the incorporation of the apparatus of my invention in a sighting tunnel. Other features of my invention will be apparent from a reading of the specification that follows.

For a description of my invention, I shall refer to the accompanying drawings in which Fig. 9 is a perspective view of the front end of the apparatus of Fig. 1 with certain parts cut away to illustrate other parts inside the sighting tunnel. Fig. 10 is a view looking downward ly on a dial of the machine instrument board while Fig. 11 is an enlarged view of another portion of the instrument board.

Figure 8:
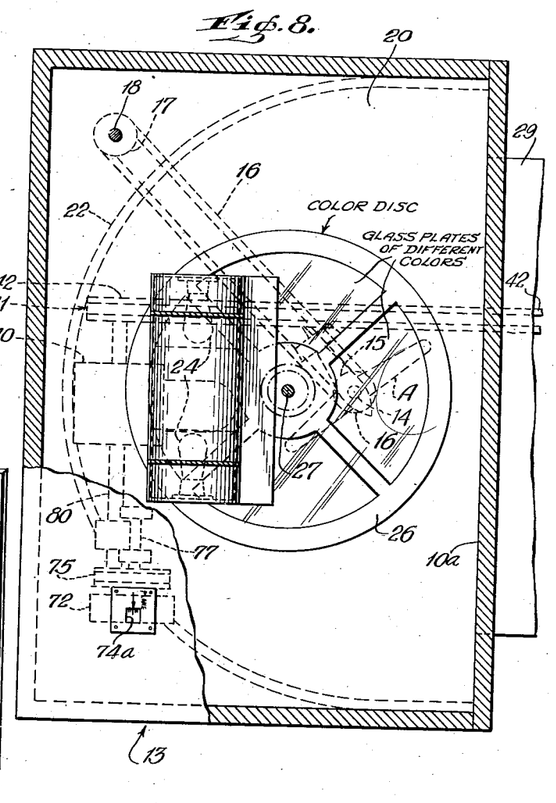
Fig. 8 is a partial section taken along lines 8—8 of Fig. 1.
Figures 9, 10, 11:
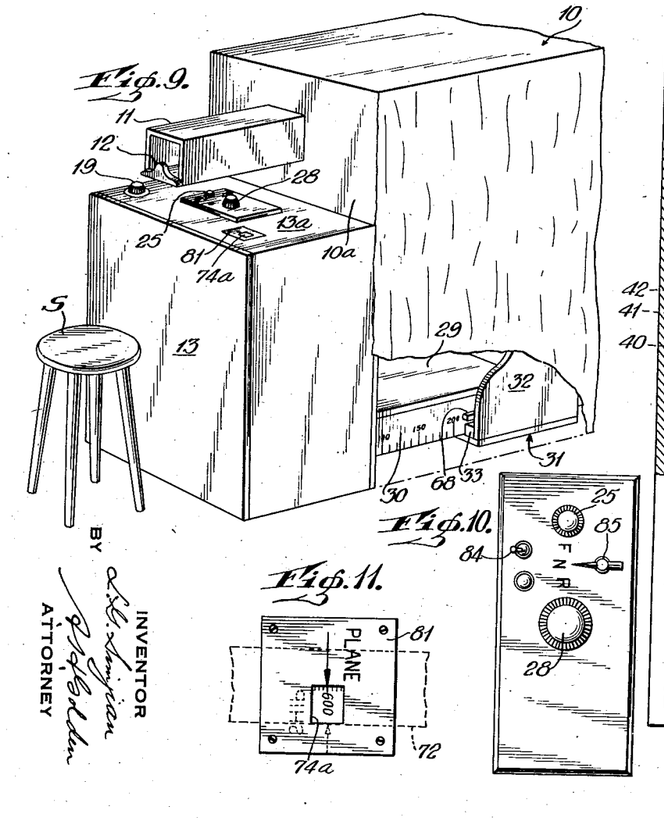

Referring now more particularly to the drawings and especially Figs. 1–9 inclusive, a sighting tunnel is designated generally by reference numeral 10 and is preferably fabricated from some inexpensive material such as plywood or fabric applied over a wood frame. This sighting tunnel is rectangular in cross section and is of considerable length as will be readily perceived. At its front end, there is formed a square sighting tube 11 probably best shown in Fig. 9, this tube opening into the sighting tunnel 10 so that an observer may rest his chin on the chin rest 12 at the front end of the sighting tube and look into the tunnel. A control cabinet 13 is applied to the end of the tunnel as is best shown in Fig. 9 and opens into the sighting tunnel 10 as can readily be seen from Figs. 1 and 4.

Figure 1:
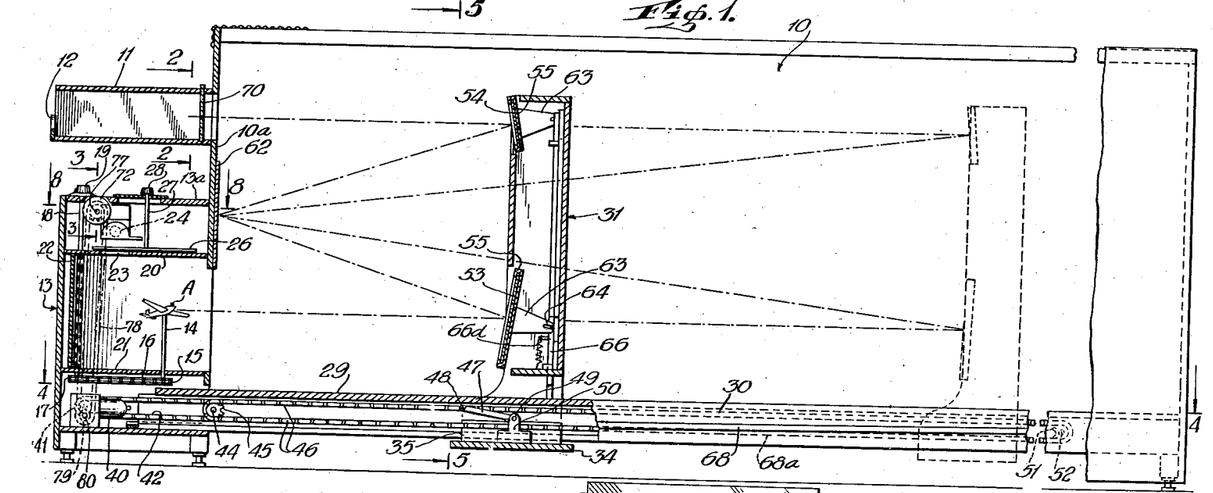
Fig. 1 is a vertical partial section of an apparatus in which my invention is embodied.

Mounted within the control cabinet 13 is a vertical shaft 14 best shown in Fig. 1. At the upper end of the shaft 14 there is secured a scale model airplane A for rotation with the shaft. The lower end of the shaft has secured thereto a sprocket 15 in engagement with a chain 16 as is probably best shown in Figs. 1 and 8. The chain 16 is in turn in engagement with a sprocket 17 on the end of a shaft 18. The shaft 18 extends upwardly and outwardly of the control cabinet 13 and has secured to its upper end a knob 19 whereby it may be rotated. It will readily be appreciated that rotation of the knob 19, through the mechanism described, effects a rotation of the airplane model A, all for the purposes to be indicated presently.

It is desirable to illuminate the model A and to control the type of illumination so as to simulate varying conditions. Thus, the combat pilot must learn how to identify planes and to determine their speed and direction of movement under light conditions corresponding to full daylight, dawn, dusk, sunset, etc. For the particular purpose, that portion of the control cabinet 13 in which the airplane model A is housed, is partitioned by an upper partitioning plate 20, a lower partitioning plate 21 and backdrop 22. Backdrop 22 is curved and is preferably decorated to simulate clouds whereby to give the impression of space. The upper partitioning plate 20 is formed with an opening 23, and through this opening 23, light enters from a pair of illuminating bulbs 24 best shown in Fig. 8. The intensity of illumination furnished by the bulbs 24 is controlled by a rheostat, the operating knob of which is designated by reference numeral 25 best shown in Figs. 9 and 10.

The particular color of the light is controlled by a color disc 26 best shown in Figs. 1 and 8, this color disc being adapted to carry a series of glass or similar plates of varying colors through which the light will shine on to the airplane model A. The color disc 26 is secured to a shaft 27 that is rotatable by a knob 28 shown best in Fig. 10. It is now quite obvious that any one sitting at the control cabinet on stool S of Fig. 9, may readily control the positioning of the airplane model A, the degree of illumination thereof and the color of the illumination. Further available controls will be referred to hereinafter.

Figures 4, 5, 6, 7:
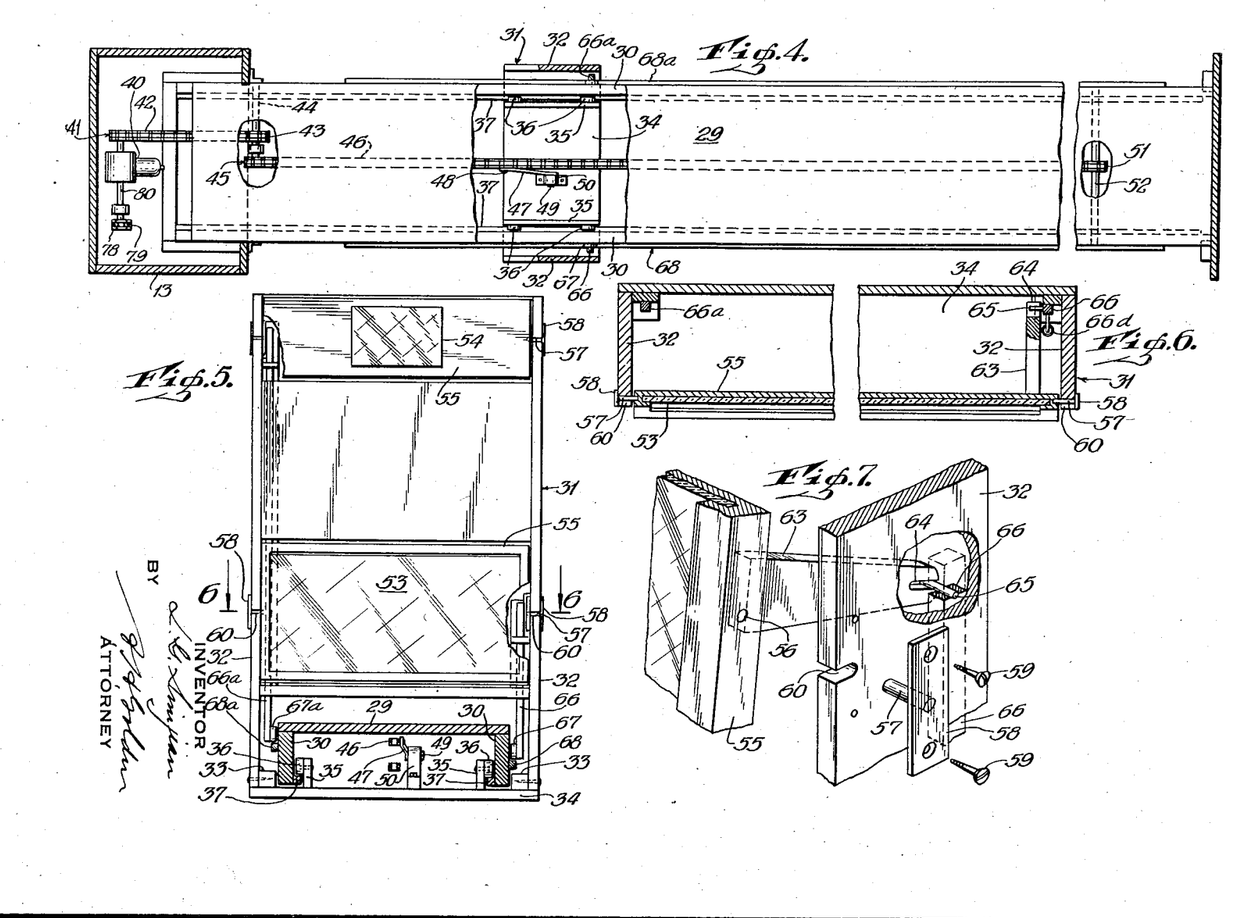
Fig. 5 is a section taken along lines 5—5 of Fig. 1.
Fig. 6 is a section taken along lines 6—6 of Fig. 5.
Fig. 7 is an exploded view of certain details of construction.

Within the sighting tunnel 10 there is secured what may be termed a track assembly. This track assembly is best shown in Figs. 1, 4 and 5 and comprises an upper plate 29 and parallel side rails 30. The track assembly, as well as the remaining parts of my invention to be described hereinafter, is formed of wood, mainly because wood at the present time is a non-strategic material. It will be well at this time to indicate that the apparatus of my invention is fabricated as shown in the drawings and as herein described, merely because it is at present desirable to use the form of fabrication and the materials shown and described. Apparatus embodying the basic concept of my invention may be fabricated in many ways other than that herein shown and described, and from materials that may be better suited for the particular purposes. Those skilled in the art will fully appreciate that my invention is a broad one and that I am entitled to patent claims that will prevent the utilization of my invention by others in physical forms other than those forms which I shall herein show and describe.

The track assembly is adapted to support for linear movement within the sighting tunnel 10 a carriage designated generally by reference numeral 31 and best shown in Figs. 1 and 5. The carriage has vertical side plates 32, the inner surfaces of which have cleats 33 secured thereto, and these cleats lie in juxtaposed relation to the rails 30 of the track assembly for guiding the carriage relatively to the track assembly. A lower plate 34 is secured to the lower ends of the side plates 32, and extending upwardly from the bottom plate 34 are brackets 35 to which may be secured rollers or other non-frictional elements 36 that rest on horizontal extensions 37 secured to the side rails 30. The cooperation of the rollers or non-frictional elements 36 with the horizontal extensions 37 serves to support the carriage 31 for linear movement relatively to the track assembly as will be quite apparent.

For moving the carriage 31 linearly on the track assembly I utilize an electric motor and gear reducer unit 40 shown best in outline in Figs. 4 and 8. This motor unit 40 has a sprocket 41 secured on its drive shaft through which it drives a chain 42. The chain 42 in turn drives a sprocket 43 on a counter shaft 44 as is best illustrated in Fig. 4. Mounted on the counter shaft 44 is a sprocket 45 that drives the continuous chain 46. As is best shown in Figs. 1 and 5, a lever 47 is pivoted at 48 to the continuous chain 46 and at 49 to a bracket 50 extending upwardly from the lower plate 34 of the carriage 31. The chain 46 is supported at its end opposite the sprocket 45 on a sprocket 51 secured to a shaft 52 as is best shown in Figs. 1 and 4. It is now obvious that continuous movement of the chain 46 effects reciprocation of the carriage 31 relatively to the track assembly rails 30, the lever 47 following the chain as it moves relatively to the sprockets 45 and 51.

The carriage 31 has pivotally mounted thereon a lower mirror 53 and an upper mirror 54. Each mirror is carried on a support plate 55 best shown in Figs. 1 and 7. Each plate 55 is bored at 56 at each side thereof so that it may readily be assembled to a pair of pivot shafts 57 formed integrally with metal plates 58 that are adapted to be secured by screws 59 to the side plates 32. Each pivot shaft 57 traverses a slot 60 in the side plates 32 as is readily seen. The purpose of the particular parts is to facilitate ready assembly of the mirrors to the carriage 31, and also to make it possible to replace mirrors quite readily and without disturbing the relation of the parts. By removing plates 58 and pivot shafts 57 as seen in Fig. 7, the mirrors 53 and 54 and their plates 55 are readily removed. Later on it will be seen how readily the mirrors are released also from their tilting mechanism.

The mirrors 53 and 54 cooperate with a vertically fixed mirror 62 best shown in Fig. 1 where it is seen secured to the end wall 10a of the sighting tunnel 10. It is obvious that in the position of the mirrors 53 and 54 shown in full lines in Fig. 1, the image of the airplane model A is reflected first from the mirror 53 to the mirror 62 and then from the mirror 62 to the mirror 54 and into the sighting tube 11. If now the carriage 31 is moved from its full line position of Fig. 1 to the dotted line position of the same figure, the mirrors 53 and 54 must be tilted on the pivot shafts 57 if the image of the airplane model A is to be reflected into the sighting tube 11.

For so tilting the mirrors 53 and 54, there is secured to each of the mirror support plates 55 a bracket 63 that is bifurcated at 64. The bracket 63 of the support plate 55 of the mirror 53 is adapted for cooperation with a pin 65 inserted into the bifurcated portion 64. The pin 65 is secured to a rod 66 best shown in Fig. 5. The rod 66 has at its lower end a cam follower 67 that rests against a cam strip 68 secured to one of the rails 30 of the track assembly. One end of the cam strip 68 may be seen best in Fig. 9. It is of course obvious that the rod 66 will through its cam follower 67 be moved upwardly and downwardly to follow cam strip 68 as the carriage 31 moves on the track assembly. It is further obvious that such movement of the rod 66 will through the pin 65 and bifurcated portion 64 of the bracket 63 effect a tilting movement of the mirror 53. For similarly moving the mirror 54 I utilize a rod 66a shown on the left side of Fig. 5. This rod 66a has a cam follower 67a that cooperates with a cam strip 68a for actuating the mirror 54 so as to properly align that mirror in all positions of the carriage. Both cam rods 66 and 66a are biased against their respective cams by springs 66d as is best seen in Fig. 1.

It is well to indicate at this time that because my apparatus is fabricated from wood, the natural shrinkage and expansion of the wood may affect the accuracy of the movement of the mirrors 53 and 54. Therefore the cam strips 68 and 68a are adapted for application to the side rails 30 of the track assembly while the carriage is at different positions and with the mirrors adjusted to properly throw the images. In this way, the cam strips may be accurately applied and adjusted as the mirrors are held in adjusted position, all as will be readily understood by those skilled in the art. It is of course possible also to form the cam strips 68 in short sections to facilitate their adjustment. It is interesting to note that mirror support brackets 63 are readily separable from pins 65 to facilitate assembly and removal of support plates 55 for purposes already set forth.

It will now be rather obvious that any one looking through the sighting tunnel will see the image of the airplane model A in all positions of the carriage 31. It is obvious of course also that as the position of the carriage 31 changes, the size of the image of the airplane model A is changed and the apparent distance of the model from the sighting tube 11 is changed. In actual practice the airplane model A has a predetermined accurate size relation to a true airplane. The carriage 31 is so related to the size of the airplane model A that at different positions of the carriage 31, the pilot looking at the image A from a sighting point at the end of the sighting tube 11 will view the image at various apparent distances corresponding to true distances. In other words, at a predetermined position of the carriage 31 he will see the airplane model A just exactly as the real airplane would appear at the particular distance for which the carriage is then set. Thus, if the airplane model A represents a Messerschmitt plane, and the carriage 31 is positioned at a point corresponding to a distance from the sighting point of 150 yards, then the pilot will see the plane model A exactly as a real Messerschmitt would appear at a distance of 150 yards. As the carriage 31 is moved to an apparent distance greater or less than 150 yards the image of the model A will change in size just as a real Messerschmitt plane would change in size when moving away from or toward a pilot from an initial point 150 yards away.

Figure 2:
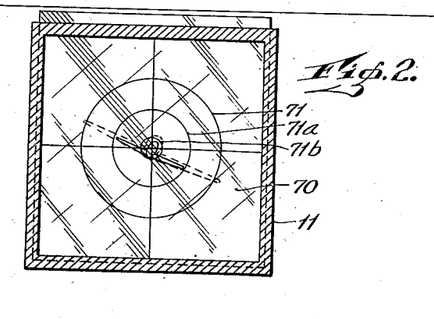
Fig. 2 is a section taken along lines 2—2 of Fig. 1.

The student pilot will observe the plane model A through a sighting glass designated by reference numeral 70, and having concentric circles 71, 71a, 71b formed thereon as best illustrated in Fig. 2 corresponding to an actual gunsight. The purpose of the concentric circles 71, 71a, 71b is to train the student pilot in determining how far from him is the airplane being observed and its speed of travel. Thus, the pilot will know that if a Messerschmitt plane is in the position relatively to the concentric circle 71 shown in Fig. 2 it is 150 yards away. If the Messerschmitt extends only across the diameter of the smaller concentric circle 71a shown in Fig. 2 is may be 600 yards away, and for circle 71b it is possibly 1200 yards away. Naturally, large bombers at distances of 150, 600 and 1200 yards have other relations to the concentric circles 71, 71a, 71b. Therefore, a student pilot may be trained to determine immediately through his knowledge of particular planes just how far those planes are from him. Then, by counting the time it takes for a plane to change from a position corresponding to the diameter of one of the concentric circles 71, 71a, 71b to the diameter of another of the concentric circles, he calculates the speed of movement of a particular plane. Thus, if the pilot determines that it takes ten seconds for a Messerschmitt plane to move from the position of the large circle 71 as in Fig. 2, to the diameter of circle 71a, he knows that the Messerschmitt is moving three hundred miles per hour. If it takes eight seconds he can determine that the Messerschmitt is moving at three hundred and forty miles per hour. The particular figures given are not of any significance and are merely cited as examples.

Figure 3:
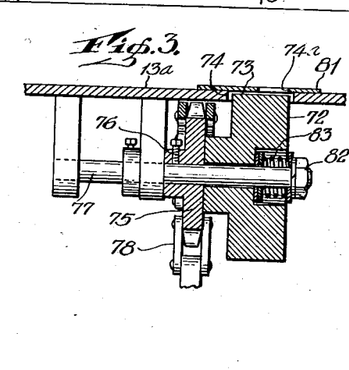
Figs. 3 and 4 are respectively sections taken along line 3—3 and 4—4 of Fig. 1.

It is now apparent that in actual practice the student sits at the machine and studies the plane images to determine their position and speed as the carriage 31 is moved to effect an apparent movement of the model A. In order that the student may check his judgment as to distance and speed of the model A, a dial 72 is mounted with its peripheral surface 73 partially exposed to view through an opening 74 in the instrument board 13a of the control cabinet 13, all as best seen in Figs. 3 and 9. The dial 72 is rotated through frictional engagement with a sprocket 75 fixed by a stud 76 to a shaft 77. The sprocket 75 is driven by a chain 78 that is in turn driven by a sprocket 79, and the sprocket 79 is actuated by the shaft 80 of the motor 40. In this way, the dial 72 is driven at a speed proportional to the speed of the carriage moving chain 46 so that the position of the dial surface 73 always corresponds to the position of the carriage and to the distance of the airplane model A from the sighting point. The dial is of course suitably calibrated in terms of distance, with the figures thereof being observed through the opening 74, and a further opening 74a of a plate 81 as best seen in Figs. 3 and 11. Plate 81 is utilized to outline the opening 74 and on one side of the said plate 81 there appears the name "Plane." Should it be desired to teach the student to recognize the various types of ships as is frequently necessary, it is merely necessary to reverse the plate 81 whereupon the name "Ship" will be visible. The opening 74a will then of course overlie that portion of surface 73 of the dial 72 that is calibrated in terms of distances that are of importance in studying ships and ship movements.

For adjusting the dial body 72 relatively to the sprocket 75 in the event adjustment for calibration is necessary, it is merely required that the nut 82 be rotated relatively to the shaft 77. This relieves the pressure on the spring 83 that holds the dial 72 frictionally against the sprocket 75. The dial 72 may now be adjusted relatively to sprocket 75, and upon tightening of the nut 82 will be held in adjustment. To facilitate calibration, side rail 30 of Fig. 9 bears numerals corresponding to those on surface 73, all as will be clearly understood. It is possible to have but slight pressure exerted by spring 83. Then, by merely holding the carriage stationary on the rail and within the range of the calibration as in Fig. 9, the dial 72 may be moved relatively to sprocket 75 by a finger through the opening 74 until the reading of the dial matches the reading taken from the position of the carriage on the rails.

Referring now to Fig. 10, the main switch of the apparatus is designated by reference numeral 84 while the motor switch for controlling the drive motor 40 is designated by reference numeral 85. The letters F, N and R represent "forward," "neutral" and "reverse" for the said motor switch. The instructor or student can readily control the apparent movement of the model as is quite clear by merely operating the switch.

Figure 14:
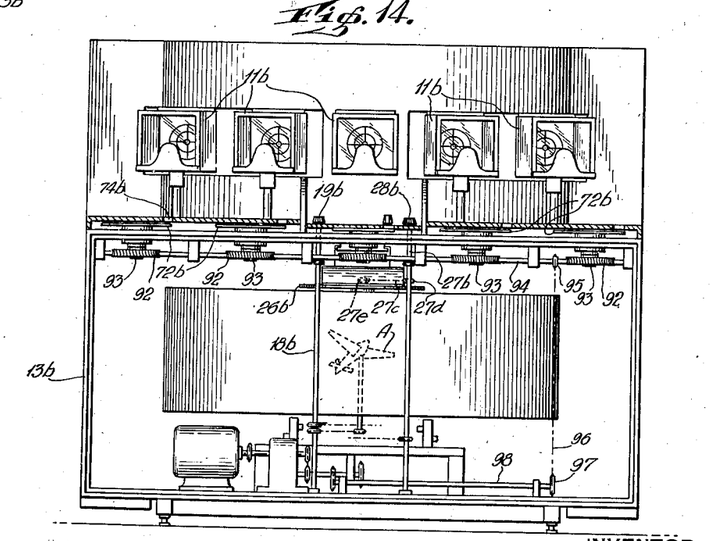
Fig. 14 is a view of the front end of the machine of Figs. 12 and 13 with certain parts thereof cut away.

In Figs. 12-17 inclusive I illustrate a modified form of my invention in which there are two sighting points for each sighting tunnel, the said sighting points being located at the opposite ends of the sighting tunnel rather than at one end as in the modification already described. In addition, five sighting tubes are positioned at each end of the sighting tunnel so that ten students may use a single tunnel. In actual practice the tunnel is usually utilized by nine students and an instructor. The tunnel in the several figures referred to is indicated by reference numeral 10b. It has a control cabinet 13b at each end thereof, and in each control cabinet there is housed an airplane model A. Through suitable means of connection, the airplane models A are moved synchronously by a single operating shaft 18b controlled by a knob 19b as best seen in Fig. 14.

Figure 15:
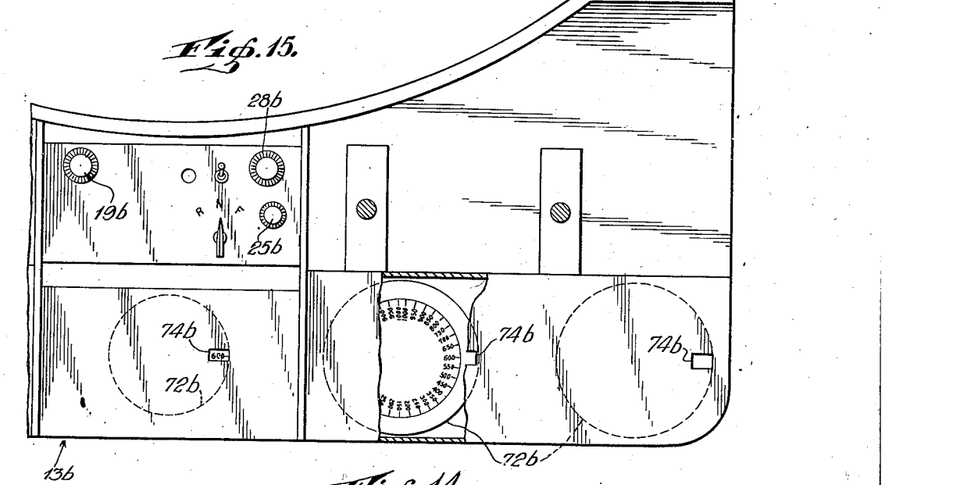
Fig. 15 is a view of the right half portion of the instrument panel at one end of the machine of Figs. 12 and 13.

The knob 28b best shown in Fig. 15 is utilized to rotate the shaft 27b and thereby to control the color of illumination of the two airplane models A in much the manner in which the said control is exercised in the first modification. Thus, through a chain 27c and sprockets 27d and 27e color disc 26b is rotated over model A in Fig. 14. Through a similar drive from shaft 27b a color disc 1e is rotated over the other model A. The knob 27a is of course used to control the degree of illumination of the model airplanes in the same manner as in the first modification. It will now be appreciated that through the controls positioned on one of the control cabinets 13b the two airplane models are illuminated so that the students at all the sighting points will receive the same color effect.

Figures 16, 17:
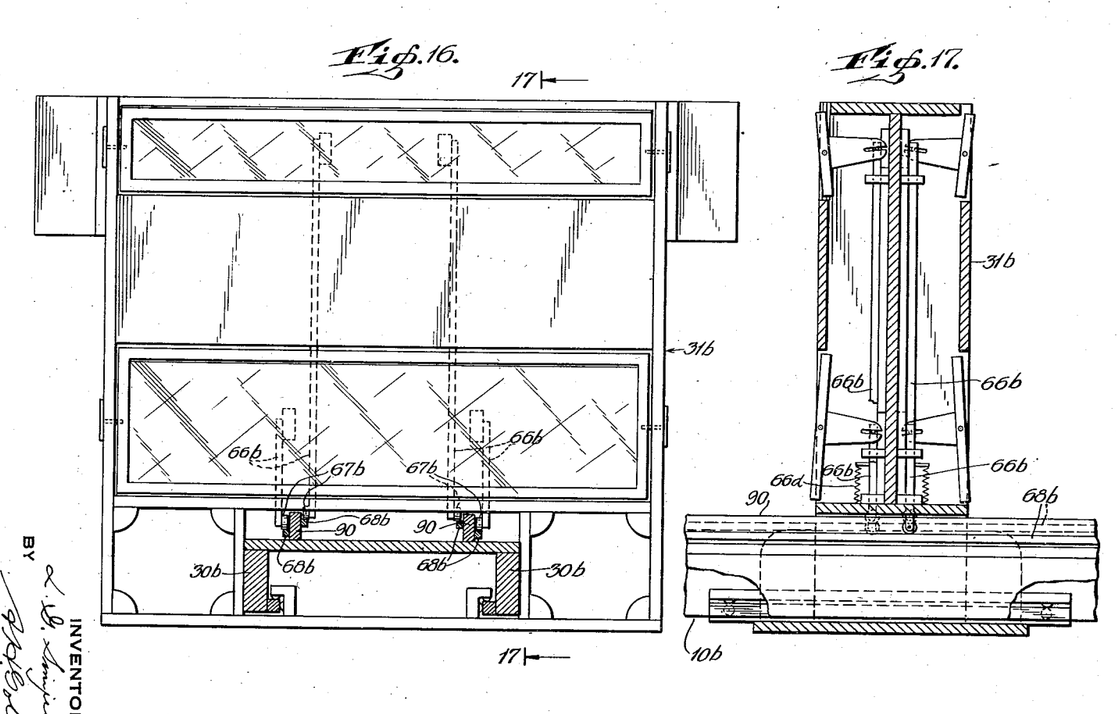
Fig. 16 is a section taken along lines 16 of Figs. 12.
Fig. 17 is a section taken along lines 17—17 of Fig. 16.

In my second modification, a single mirror carriage 31b is utilized, this carriage being moved relatively to a track assembly much in the same manner as the carriage of the first modification. It is thought unnecessary to describe in any more detail the construction of the track assembly, that construction being very well shown in Fig. 16 in which the side rails are designated by reference numeral 30b. Four mirrors are mounted on the carriage 31b and these mirrors occupy the entire width of the carriage as is best seen in Fig. 16. Naturally, the two forward mirrors are adapted for cooperation with the forward sighting tubes 11b while the two rear mirrors are adapted for cooperation with the rear sighting tubes 11b. The mirrors are adapted for pivotal movement in exactly the same manner as the mirrors of the first modification; however, four cam strips 68b are required instead of two cam strips 68 of the first modification, one cam strip for each mirror.

As is well seen in the drawings, two cam strips 68b are adapted for cooperation with the two forward mirrors and the other two cam strips 68b are adapted for cooperation with the two rear mirrors, the cam strips acting through cam followers and rods in exactly the same manner as the earlier modification. The cam strips 68b are secured to the inner and outer surfaces of each of two cam rails 90 as best seen in Fig. 16. The several cam followers bear the reference numeral 67b while the several rods to which the followers are secured bear the reference numeral 66b whereby to distinguish from the reference numerals 66 and 67 that were applied to similar parts in the first modification.

It is obvious of course, that the apparent distance between a sighting point and the airplane model at one side of the sighting tunnel is complementary to the distance between a sighting point and the airplane model at the other side of the tunnel. The distances remain complementary as the carriage 31b moves back and forth in the sighting tunnel. It is not thought necessary to further complicate the description of the second modification by adding additional details describing the specific construction of the parts referred to. It will be well to indicate however that the sighting tubes 11b are pivotally mounted on shafts 74c in order that they may be moved to follow the moving airplane image. This feature is not required when the sighting tube is directed always in line with the image as in the first modification.

Instead of using the single dial 72 of the first modification, a series of dials 72b are mounted at each control cabinet, there being one dial for each sighting tube 11b. The several discs 72b are rotated synchronously through the following means:

Suitably secured to each of the discs 72b is a worm gear 92. The series of worm gears 92 are driven by a series of worms 93 fixed to a shaft 94, there being one shaft 94 mounted in each of the control cabinets 13b. As shown in Fig. 14 the shaft 94 at one end of the sighting tunnel is formed with a sprocket 95 that is driven by a chain 96. The chain 96 is in turn driven by a sprocket 97 on a shaft 98, and the shaft 98 is suitably driven through sprocket chains in synchronous relation to the chain 46b that drives the carriage 31b.

Figure 12:
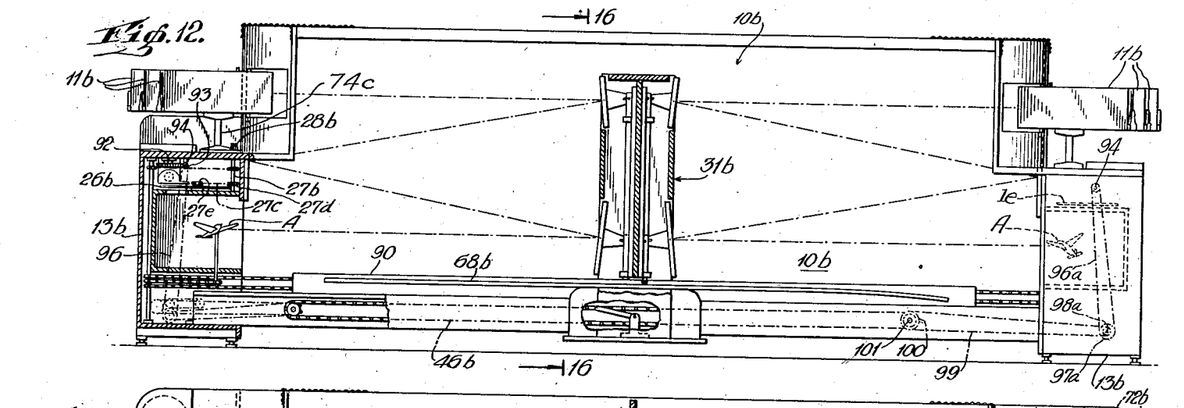
Fig. 12 is a vertical section similar to that of Fig. 1 but made of the double ender machine.
Figure 13:
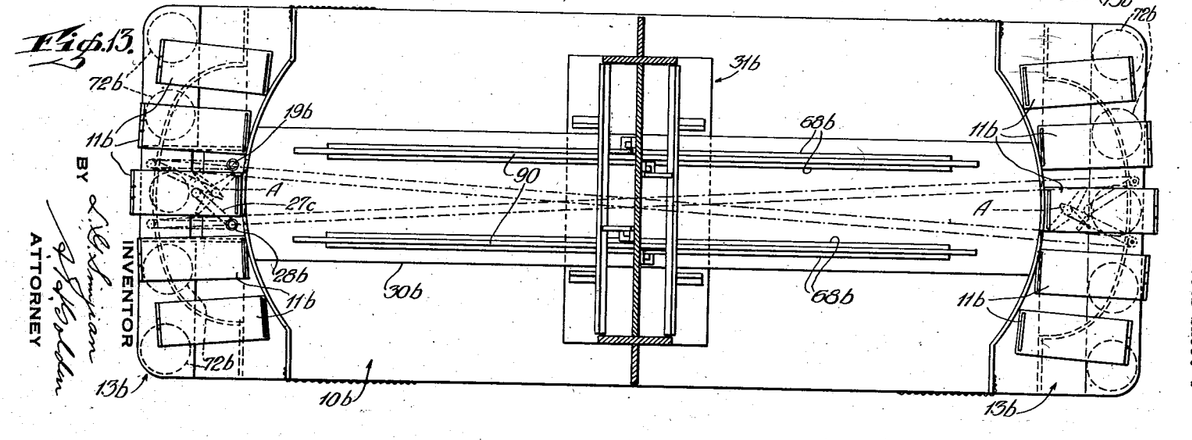
Fig. 13 is a partial horizontal section of Fig. 12.

The shaft 94 at the other end of the sighting tunnel is best shown in Fig. 12 where it is driven by a chain 96a that is actuated by a sprocket 97a, the said sprocket being on a shaft 98a that is suitably driven by the chain 99. The chain 99 is in turn actuated by a sprocket 100 on the shaft 101 driven by chain 46b. In this way, the several discs 72b at the right hand end of the sighting tunnel, looking at Fig. 12, are driven at the same speed as the several discs 72b illustrated in Fig. 14. The numerals on the dials 72b are discernible through a series of openings 74b so that the students may check themselves.

In addition, if examinations are to be given, it is possible for the instructor to apply a circular sheet of paper to each of the several discs 72b, with the paper being held against movement relatively to the said discs. The instructor may then require the students to write on the papers the apparent positions and speed of the plane models A incidental to his operation of the carriage 31b. This the students will do through openings 74b. Since the instructor knows through examination of his particular disc 72b shown in Fig. 15 just what is the correct answer, he can easily examine the students' papers to determine their correctness. The students can of course also check their own papers against the discs 72b if that is found desirable. I believe that the operation and construction of my invention will now be quite apparent to those skilled in the art.

I now claim:

1. In a combination of the class described, a sighting point, an object adapted to be viewed from said sighting point through the reflection of its image to said sighting point, a reflecting system for reflecting the image of said object to said sighting point, and means for moving a part of said reflecting system uniformly and continuously at a uniform speed whereby to vary continuously and uniformly the apparent distance between said sighting point and said object.

2. In a combination of the class described, a sighting point, an object adapted to be viewed from said sighting point through the reflection of its image to said sighting point, a series of mirrors positioned for reflecting the image of said object to said sighting point, and means for contributing compound movement to certain of said mirrors for positioning said mirrors in different reflecting relations to said object whereby to vary the apparent distance between said sighting point and said object.

3. In a combination of the class described, a sighting point, an object adapted to be viewed from said sighting point through the reflection of its image to said sighting point, a reflecting system for reflecting the image of said object to said sighting point along a predetermined line, means for moving part of said reflecting system bodily into different reflecting positions relatively to said object whereby the apparent distance between said sighting point and said object is varied, and means for imparting additional movement to said part of said reflecting system whereby in all positions of this system the image is directed along the said predetermined line to said sighting point.

4. In a combination of the class described, a sighting point, an object adapted to be viewed from said sighting point through the reflection of its image to said sighting point, a series of mirrors for reflecting the image of said object to said sighting point, means for moving certain of said reflecting mirrors relatively to said object whereby the apparent distance between said sighting point and said object is varied, and means for tilting certain of said mirrors while they are moving whereby to direct the image of said object to said sighting point in all positions of said mirrors.

5. In a combination of the class described, a sighting point, an object adapted to be viewed from said sighting point through the reflection of its image to said sighting point, a reflecting system including a mirror for reflecting the image of said object to said sighting point, means for moving a part of said reflecting system relatively to said object whereby the apparent distance between said sighting point and said object is varied, and means for tilting said mirror as said part of the reflecting system and object move relatively to one another whereby to direct the image of said object to said sighting point in all positions of said part of said reflecting system.

6. In a combination of the class described, a fixed sighting point, an object at a fixed location adapted to be viewed from said sighting point through the reflection of its image to said sighting point, a series of mirrors for reflecting the image of said object to said sighting point, means mounting certain of said reflecting mirrors for linear movement relatively to said sighting point whereby the apparent distance between said sighting point and said object is varied, means for moving said mirrors relatively to said sighting point, and means for tilting certain of said mirrors while said mirrors are moving linearly whereby to direct the image of said object to said sighting point in all positions of said mirrors.

7. In a combination of the class described, a sighting point, an object adapted to be viewed from said sighting point through the reflection of its image to said sighting point, a series of mirrors for reflecting the image of said object to said sighting point, means mounting two of said reflecting mirrors for linear movement relatively to said sighting point whereby the apparent distance between said sighting point and said object is varied, means for moving said mirrors linearly, and means for tilting said two mirrors as they are moved linearly whereby to direct the image of said object to said sighting point in all linear positions of said mirrors.

8. In a combination of the class described, a sighting point, an object adapted to be viewed from said sighting point through the reflection of its image to said sighting point, a series of mirrors for reflecting the image of said object to said sighting point, a carriage movable linearly relatively to said sighting point, means mounting at least two of said reflecting mirrors on said carriage for linear movement therewith whereby the apparent distance between said object and said sighting point is varied, and means for tilting said mirrors as they move linearly with said carriage whereby to direct the image of said object to said sighting point in all linear positions of said carriage.

9. In a combination of the class described, a sighting point, an object adapted to be viewed from said sighting point, three mirrors positioned so that the image of said object is reflected from the first mirror to the second mirror, from the second mirror to the third mirror, and from the third mirror to the sighting point, means mounting certain of said reflecting mirrors for linear movement relatively to said sighting point whereby the apparent distance between said sighting point said object is varied, means for moving said mirrors linearly, and means for tilting certain of said mirrors whereby to direct the image of said object to said sighting point in all linear positions of said linearly moved mirrors.

10. In a combination of the class described, a sighting point, an object adapted to be viewed from said sighting point, three mirrors positioned so that the image of said object is reflected from the first mirror to the second mirror, from the second mirror to the third mirror, and from the third mirror to the sighting point, a carriage movable linearly relatively to said sighting point, means mounting two of said reflecting mirrors on said carriage for linear movement therewith, whereby the apparent distance between said object and said sighting point is varied, and means for tilting said mirrors as they move linearly with said carriage whereby to direct the image of said object to said sighting point in all linear positions of said carriage.

11. In a combination of the class described, a viewing tunnel, a sighting point for said tunnel, an object in said tunnel adapted to be viewed from said sighting point through the reflection of its image to said sighting point, a reflecting system in said tunnel for reflecting the said image to said sighting point, and means for moving a part of said reflecting system uniformly and continuously at a uniform speed whereby to vary continuously and uniformly the apparent distance between said sighting point and said object.

12. In a combination of the class described, a viewing tunnel, a sighting point for said tunnel, an object in said tunnel adapted to be viewed from said sighting point through the reflection of its image to said sighting point, a reflecting system in said tunnel including a mirror for reflecting the said image to said sighting point, means for moving said mirror bodily relatively to said object whereby to vary the apparent distance between said sighting point and said object, and means for tilting said mirror as it moves bodily whereby to reflect said image to said sighting point in all positions of said mirror.

13. In a combination of the class described, a viewing tunnel, a sighting point for said tunnel, an object in said tunnel adapted to be viewed from said sighting point through the reflection of its image to said sighting point, a reflecting system, positioned in said tunnel for reflecting the said image to said sighting point along a predetermined line, and means for contributing compound movement to a part of said reflecting system for positioning said part in different reflecting relations relatively to said object whereby to vary the apparent distance between said sighting point and said object and to direct the image of said object to said sighting point along said predetermined line in all positions of said part of said reflecting system relatively to said object.

14. In a combination of the class described, a viewing tunnel, a sighting point at one end of the tunnel, an object vertically displaced from said sighting point at said end of the tunnel, a series of mirrors in said tunnel for reflecting the image of said object to said sighting point, means mounting certain of said reflecting mirrors for linear movement relatively to said sighting point whereby the apparent distance between said sighting point and said object is varied, means for moving said mirrors linearly, and means for tilting certain of said mirrors whereby to direct the image of said object to said sighting point in all linear positions of said linearly moved mirrors.

15. In a combination of the class described, a viewing tunnel, a sighting point at one end of the tunnel, an object vertically displaced from said sighting point at said end of the tunnel, a series of mirrors in said tunnel for reflecting the image of said object to said sighting point, a carriage movable linearly relatively to said sighting point, means mounting at least two of said reflecting mirrors on said carriage for linear movement therewith whereby the apparent distance between said object and said sighting point is varied, and means for tilting said mirrors as they move linearly with said carriage whereby to direct the image of said object to said sighting point in all linear positions of said carriage.

16. In a combination of the class described, a viewing tunnel, a sighting point at one end of the tunnel, an object vertically displaced from said sighting point at said end of the tunnel, a series of mirrors in said tunnel including at least one mirror positioned vertically between said sighting point and object and two additional mirrors, one of said additional mirrors reflecting the image of the object on to the vertically positioned mirror, which the other of said additional mirrors reflects the image from said vertically positioned mirror to said sighting point, means for moving said additional mirrors linearly relatively to said sighting point whereby the apparent distance between said sighting point and said object is varied, and means for tilting said additional mirrors as they are moved linearly so as to position them continuously to receive and reflect said images to said sighting point.

17. In a combination of the class described, a sighting point, an object adapted to be viewed from said sighting point through the reflection of its image to said sighting point, a reflecting system for reflecting the image of said object to said sighting point, and power means for continuously moving a part of said reflecting system and said object relatively to one another at a uniform speed whereby to vary continuously and uniformly the apparent distance between said sighting point and said object.

18. In a combination of the class described, a viewing tunnel, a sighting point for said tunnel, and object in said tunnel adapted to be viewed from said sighting point through the reflection of its image to said sighting point, a reflecting system in said tunnel for reflecting the said image to said sighting point, and means controlled from said sighting point for illuminating said object.

19. In a combination of the class described, a viewing tunnel, a sighting point for said tunnel, an object in said tunnel adapted to be viewed from said sighting point through the reflection of its image to said sighting point, a reflecting system in said tunnel for reflecting the said image to said sighting point, illuminating means for illuminating said object to simulate illumination during certain weather and time conditions, and means controlled from said sighting point for actuating said illuminating means to vary the illumination of said object.

20. In a combination of the class described, a viewing tunnel, a sighting point for said tunnel, an object in said tunnel adapted to be viewed from said sighting point through the reflection of its image to said sighting point, a reflecting system in said tunnel for reflecting the said image to said sighting point, means for throwing variable colors on said object to simulate illumination during varying weather and time conditions, and manually operated means at said sighting point for actuating said color throwing means.

21. In a combination of the class described, a sighting point, an object positioned to be viewed from said sighting point, a reflecting system through which the image of the object is reflected to said sighting point, and means at said sighting point for effecting the movement of said object to reflect different views thereof to said sighting point.

22. In a combination of the class described, a sighting point, an object vertically displaced from said sighting point, a reflecting system through which the image of the object is reflected to said sighting point, a shaft extending from said sighting point toward said object, means of connection between said shaft and object whereby rotation of said shaft effects rotation of said object, and means at said sighting point for rotating said shaft.

23. In a combination of the class described, a sighting point, an object to be viewed from said sighting point, a reflecting system for reflecting the image of said object to said sighting point, means for moving said object and at least part of said reflecting system relatively to one another whereby to vary the apparent distance between said sighting point and said object as viewed from said sighting point, and means for imparting additional movement to a portion of said reflecting system whereby to direct the reflection of said object to said sighting point in all the relative positions of said object and said part of said reflecting system.

24. In a combination of the class described, a sighting point, an object adapted to be viewed from said sighting point through the reflection of its image to said sighting point, a reflecting system for reflecting the image of said object to said sighting point, means mounting a part of said reflecting system for movement relatively to said sighting point whereby the apparent distance between said sighting point and said object is varied, means for moving said part, a dial at said sighting point, and means for moving said dial as said part of said reflecting system is moved, said dial bearing indicia indicating the apparent distance of said object from said sighting point as determined by the positions of said part of said reflecting system.

25. In a combination of the class described, a sighting point, an object adapted to be viewed from said sighting point through the reflection of its image to said sighting point, a series of mirrors for reflecting the image of said object to said sighting point, means mounting certain of said reflecting mirrors for linear movement relatively to said sighting point whereby the apparent distance between said sighting point and said object is varied, means for moving said mirrors linearly, and cam mechanism for tilting certain of said mirrors as said mirrors move linearly whereby to direct the image of said object to said sighting point in all linear positions of said linearly moved mirrors.

26. In a combination of the class described, a sighting point, an object adapted to be viewed from said sighting point through the reflection of its image to said sighting point, a reflecting system for reflecting the image of said object to said sighting point, means mounting a part of said reflecting system for movement relatively to said sighting point whereby the apparent distance between said sighting point said object is varied, means for moving said part of said reflecting system, a rotating dial at said sighting point, means for rotating said dial as said part is moved, said dial bearing indicia indicating the apparent distance of said object from said sighting point as determined by the positions of said part, and means for adjusting the position of said dial relatively to the position of said part of said reflecting system to calibrate said dial to the said part.

27. In a combination of the class described, a sighting point, an object adapted to be viewed from said sighting point through the reflection of its image to said sighting point, a series of mirrors for reflecting the image of said object to said sighting point, a carriage, bearing means on which said carriage moves linearly relatively to said sighting point, means mounting certain of said mirrors on said carriage for linear movement with said carriage and also for tilting movement relatively to said carriage, cam mechanism on said bearing means, and means extending from said cam mechanism to said mirror mounting means for pivoting said mirrors as said carriage moves linearly on said bearing means whereby to direct the image of said object to said sighting point in all linear positions of said mirrors.

28. In a combination of the class described, a sighting point, an object adapted to be viewed from said sighting point through the reflection of its image to said sighting point, a reflecting system for reflecting the image of said object to said sighting point, means for moving a part of said reflecting system relatively to said sighting point whereby to vary the apparent distance between said sighting point and said object, and a concentric ring sighting device at said sighting point to determine the apparent distance of said object from said sighting point and the apparent speed of movement of its image through movement of said part of said reflecting system.

29. In a combination of the class described, a sighting point, an object adapted to be viewed from said sighting point by the reflection of its image to said sighting point by a series of fixed and movable mirrors, movable and stationary mirrors for so reflecting said image, means for bodily moving said movable mirrors linearly to vary the distance of said mirrors relatively to said sighting point and thereby vary the apparent distance of said object from said sighting point, and means for tilting said movable mirrors so as to direct the image toward said sighting point in all linear positions of said mirrors.

30. In a combination of the class described, a fixed sighting point, an object positioned at a fixed distance from said sighting point and adapted to be viewed from said sighting point by the reflection of its image to said sighting point by a series of fixed and movable mirrors, movable and stationary mirrors for so reflecting said image, means for bodily moving said movable mirrors linearly to vary the distance of said mirrors relatively to said sighting point and thereby vary the apparent distance of said object from said sighting point, and means for tilting said movable mirrors so as to direct the image toward said sighting point in all linear positions of said mirrors.

31. In a combination of the class described, a fixed sighting point, an object positioned in vertically spaced relation to said sighting point, a vertical mirror fixed between said sighting point and said object, a pair of vertically spaced mirrors linearly spaced from said object, sighting point, and fixed mirror, and adapted to receive the image of said object and to reflect it to said fixed mirror, and then to receive the image from said fixed mirror and reflect it to the sighting point, a carriage, means mounting said pair of reflecting mirrors on said carriage for linear movement therewith whereby the apparent distance between said object and said sighting point is varied, and means for tilting said mirrors as they move linearly with said carriage whereby to direct the image of said object to said sighting point in all linear positions of said carriage.

32. In a combination of the class described, a sighting point, an object, a series of mirrors for reflecting the image of said object to said sighting point, means whereby the distance between at least certain of said mirrors and said object is varied, and means for tilting said mirrors as said distance is varied whereby in all distance relationships of said mirrors and object, the image of said object is reflected to said sighting point.

33. In a combination of the class described, a pair of spaced sighting points to each of which an image is reflected by a series of mirrors, mirror supporting means movable between said sighting points, mirrors mounted on said mirror supporting means, certain of said mirrors reflecting an image to one of said sighting points, and others of said mirrors reflecting an image to the other of said sighting points.

34. In a combination of the class described, a pair of linearly spaced sighting points to each of which an image is reflected by a series of mirrors, mirror supporting means movable between said sighting points, mirrors mounted on said mirror supporting means, certain of said mirrors reflecting an image to one of said sighting points, and others of said mirrors reflecting an image to the other of said sighting points, and means for moving said mirror supporting means to vary in complementary relation the distances between said mirrors and said sighting points.

35. In a combination of the class described, a pair of sighting points linearly spaced, objects to be viewed from said sighting points through the reflection of their images to said sighting points, a carriage movable linearly between said sighting points and approaching one sighting point when leaving the other sighting point, mirrors on said carriage for reflecting the image of one of said objects to one of said sighting points and for reflecting the image of the other object to the other of said sighting points, the movement of said carriage and mirrors acting to increase and decrease the apparent distance between each of said sighting points and the object whose image is reflected thereto.

36. In a combination of the class described, a pair of spaced sighting points, a pair of objects, one to be viewed at one sighting point and the other at the other sighting point, mirror supporting means movable between said sighting points, mirrors mounted on said mirror supporting means, certain of said mirrors reflecting one of said objects to one of said sighting points, and others of said mirrors reflecting the other of said objects to the other of said sighting points.

37. In a combination of the class described, a pair of spaced sighting points, a pair of objects, one to be viewed at one sighting point and the other at the other sighting point, mirror supporting means movable between said sighting points, mirrors mounted on said mirror supporting means, certain of said mirrors reflecting one of said objects to one of said sighting points, and others of said mirrors reflecting the other of said objects to the other of said sighting points, means for moving said mirror supporting means whereby to vary in complementary relation the apparent distance between each of said objects and each of said sighting points.

38. In a combination of the class described, a pair of spaced sighting points, a pair of objects, one to be viewed at one sighting point and the other at the other sighting point, mirror supporting means movable between said sighting points, mirrors mounted on said mirror supporting means, certain of said mirrors reflecting one of said objects to one of said sighting points, and others of said mirrors reflecting the other of said objects to the other of said sighting points, means for moving said mirror supporting means whereby to vary in complementary relation the apparent distance between each of said objects and each of said sighting points, and means for tilting said mirrors as they move with same mirror supporting means whereby to direct the images of said objects to said sighting points in all positions of said mirror supporting means.

39. In a combination of the class described, a pair of linearly spaced sighting points to each of which an image is reflected by a series of mirrors, a carriage movable linearly between said sighting points and approaching one sighting point when leaving the other sighting point, mirrors on said carriage positioned so that certain of said mirrors reflect an image to one of said sighting points while others of said mirrors reflect an image to the other of said sighting points, the movement of said carriage and mirrors acting to increase and decrease the apparent distance between each of said sighting points and the object whose image is reflected thereto.

40. In a combination of the class described, a sighting tunnel, a sighting point at each end of the tunnel, an object positioned at each end of the tunnel, a carriage movable in said tunnel between said sighting points, mirrors on said carriage facing toward one sighting point and other mirrors on said carriage facing the other sighting point, said mirrors acting to reflect the images of said objects to the said sighting points, means for moving said carriage in said tunnel so that it approaches one sighting point when withdrawing from the other sighting point, the movement of said carriage and mirrors acting to increase and decrease the apparent distance between each of said sighting points and the object whose image is reflected thereto.

41. In a combination of the class described, a sighting tunnel, a sighting point at each end of the tunnel, an object positioned at each end of the tunnel, a carriage movable in said tunnel between said sighting points, mirrors on said carriage facing toward one sighting point and other mirrors on said carriage facing the other sighting point, said mirrors acting to reflect the images of said objects to the said sighting points, means for moving said carriage in said tunnel so that it approaches one sighting point when withdrawing from the other sighting point, the movement of said carriage and mirrors acting to increase and decrease the apparent distance between each of said sighting points and the object whose image is reflected thereto, and means for tilting said mirrors as they move with said carriage whereby to direct the images of said objects to said sighting points in all positions of said mirrors and carriages.

42. In a combination of the class described, a sighting tunnel, a sighting point at each end of the tunnel, an object positioned at each end of the tunnel, a carriage movable in said tunnel between said sighting points, mirrors on said carriage facing toward one sighting point and other mirrors on said carriage facing the other sighting point, said mirrors acting to reflect the images of said objects to the said sighting points, means for moving said carriage in said tunnel so that it approached one sighting point when withdrawing from the other sighting point, the movement of said carriage and mirrors acting to increase and decrease the apparent distance between each of said sighting points and the object whose image is reflected thereto, a series of dial movably mounted at each of said sighting points, and means whereby said dials move in predetermined relation to said carriage.

43. In a combination of the class described, a sighting tunnel, a sighting point at each end of the tunnel, an object positioned at each end of the tunnel, a carriage movable in said tunnel between said sighting points, mirrors on said carriage facing toward one sighting point and other mirrors on said carriage facing the other sighting point, said mirrors acting to reflect the images of said objects to the said sighting points, means for moving said carriage in said tunnel so that it approaches one sighting point when withdrawing from the other sighting point, the movement of said carriage and mirrors acting to increase and decrease the apparent distance between each of said sighting points and the object whose image is reflected thereto, a series of dial movably mounted at each of said sighting points, means whereby said dials move in predetermined relation to said carriage, indicia on each of said dials, and writing paper applied to said dials for inscription.

44. In a combination of the class described, a sighting point, an object adapted to be viewed from said sighting point through the reflection of its image to said sighting point, a reflecting system including a mirror for reflecting the image of said object to said sighting point, means for moving said mirror linearly whereby the apparent distance between said sighting point and said object is varied, and means for tilting said mirror as it moves linearly whereby to direct the image of said object to said sighting point in all positions of said mirror.

45. In a combination of the class described, a sighting point, an object adapted to be viewed from said sighting point through the reflection of its image to said sighting point, a reflecting system for reflecting the said image to said sighting point, means for throwing variable colors on said object to simulate illumination during varying weather and time conditions, and manually operated means at said sighting point for actuating said color throwing means.

LUTHER G. SIMJIAN.